(12) United States Patent
Liu

(10) Patent No.: US 9,065,282 B2
(45) Date of Patent: Jun. 23, 2015

(54) MOBILE CHARGER

(75) Inventor: Yun-Zhao Liu, Guangdong Province (CN)

(73) Assignee: Guangdong Jetfast Portable Lighting Co., Ltd., Guangdong (CN)

( * ) Notice: Subject to any disclaimer, the term of this patent is extended or adjusted under 35 U.S.C. 154(b) by 238 days.

(21) Appl. No.: 13/978,640

(22) PCT Filed: Mar. 9, 2011

(86) PCT No.: PCT/CN2011/071651
§ 371 (c)(1),
(2), (4) Date: Jul. 8, 2013

(87) PCT Pub. No.: WO2012/119311
PCT Pub. Date: Sep. 13, 2013

(65) Prior Publication Data
US 2013/0300349 A1  Nov. 14, 2013

(51) Int. Cl.
*H02J 7/00* (2006.01)
*H01M 2/10* (2006.01)
*H01M 10/46* (2006.01)

(52) U.S. Cl.
CPC ............ *H02J 7/0042* (2013.01); *H02J 7/0044* (2013.01); *H02J 7/0045* (2013.01); *H01M 2/1055* (2013.01); *H01M 10/46* (2013.01); *Y02E 60/12* (2013.01)

(58) Field of Classification Search
CPC ...... H02J 7/0042; H02J 7/0044; H02J 7/0045
USPC .................................. 320/107, 111, 113–115
See application file for complete search history.

(56) References Cited

U.S. PATENT DOCUMENTS

| | | | |
|---|---|---|---|
| 2003/0015991 A1* | 1/2003 | Tung et al. | 320/114 |
| 2006/0202702 A1* | 9/2006 | Ham et al. | 324/537 |
| 2007/0241721 A1* | 10/2007 | Weinstein et al. | 320/114 |
| 2008/0197803 A1* | 8/2008 | Daniel et al. | 320/107 |
| 2009/0011286 A1* | 1/2009 | Liu | 429/7 |
| 2011/0068741 A1* | 3/2011 | Liu | 320/114 |
| 2011/0074340 A1* | 3/2011 | Kao | 320/107 |
| 2011/0080136 A1* | 4/2011 | Ma et al. | 320/107 |
| 2012/0212177 A1* | 8/2012 | Peacock et al. | 320/107 |
| 2013/0076298 A1* | 3/2013 | Miller et al. | 320/103 |

(Continued)

*Primary Examiner* — Stacy Whitmore
(74) *Attorney, Agent, or Firm* — Rosenberg, Klein & Lee

(57) ABSTRACT

A mobile charger includes a housing (1). A cell (2) is provided in the housing (1). A positive power distribution unit (4) and a negative power distribution unit (5) are provided at both ends of the housing (1) relative to the positive and the negative poles (21, 22) of the cell (2) respectively. A conducting piece set (3) is provided in the housing (1). The conducting piece set (3) is connected to the positive power distribution unit (4) and the negative power distribution unit (5). A charging unit (6) and a power supplying unit (7) are provided in the housing (1). The charging unit (6) and the power supplying unit (7) are electrically connected with the positive pole (21) of the cell (2) through the positive power distribution unit (4) and the conducting piece set (3) and electrically connected with the negative pole (22) of the cell (2) through the negative power distribution unit (5). Thus, the cell (2) is charged with direct current which is converted from alternating current through a AC charge by the charging unit (6), and then direct current is outputted from the cell (2) through the power supplying unit (7), so as to provide sufficient electric power to an electronic product which needs to use a DC power supply at any time and anywhere.

6 Claims, 4 Drawing Sheets

(56) References Cited

U.S. PATENT DOCUMENTS

| | | | |
|---|---|---|---|
| 2013/0181661 A1* | 7/2013 | Workman et al. | 320/107 |
| 2013/0200841 A1* | 8/2013 | Farkas et al. | 320/107 |
| 2013/0221922 A1* | 8/2013 | Liu | 320/111 |
| 2013/0236774 A1* | 9/2013 | Liu | 429/179 |
| 2014/0021905 A1* | 1/2014 | Tsai | 320/107 |
| 2014/0053857 A1* | 2/2014 | Liu | 131/329 |
| 2014/0139183 A1* | 5/2014 | Baschnagel, III | 320/115 |
| 2014/0159639 A1* | 6/2014 | Miller et al. | 320/103 |
| 2014/0239880 A1* | 8/2014 | Liu | 320/107 |
| 2014/0266026 A1* | 9/2014 | Dowd et al. | 320/108 |

* cited by examiner

MOBILE CHARGER

FIELD OF THE INVENTION

The present invention relates to a mobile charger, especially to a mobile charger that provides sufficient electric power to an electronic product which needs to use a DC power supply regardless of time and place.

DESCRIPTION OF RELATED ART

Along with the development of technology, various electronics and appliances such as mobile phones, notebooks, digital cameras, personal digital assistant (PDA), etc. have been invented and they bring great convenience to our daily life.

The power of digital products such as mobile phones comes from direct current (DC). The digital product is usually equipped with a chargeable built-in battery for power supply and the electricity storage capacity of the battery is limited. Due to compact and light-weight design of the mobile phone, the volume and electric capacity of the battery are also reduced. Thus the power is run out of quite soon and the battery is unable to be used for a long period of time. The user needs to carry an alternating current (AC) charger for charging. However, the user is at outdoors while using the mobile phone. Even he carries the AC charger, there is no AC socket. This causes trouble and inconvenience in use.

Due to limited electricity storage capacity of the battery built-in the electronics such as mobile phones and digital cameras available now and difficulties in performing AC charging at the occasions where the electronics being used, the electronics are unable to be used. Thus there is a need to develop a charger that provides sufficient power to the electronics such as mobile phones in the movement state regardless of time and place.

SUMMARY OF THE INVENTION

Therefore it is a primary object of the present invention to provide a mobile charger that provides sufficient electric power to electronic products using a DC power supply regardless of time and place.

In order to achieve the above object, a mobile charger of the present invention includes a housing and cell disposed in the housing. A positive power distribution unit and a negative power distribution unit are respectively provided at each of two ends of the housing, corresponding to a positive pole and a negative pole of the cell. A conducting piece set is mounted in the housing and is connected to the positive power distribution unit and the negative power distribution unit. A charging unit is set in the housing. A positive pin and a negative pin of the charging unit are electrically connected to the positive pole and the negative pole of the cell through the positive power distribution unit, the conducting piece set and the negative power distribution unit. A power supplying unit is provided in the housing. The positive pin and the negative pin are electrically connected to the positive pole and the negative pole of the cell through the positive power distribution unit, the conducting piece set and the negative power distribution unit.

According to the above description, the present invention has following advantages:
1. After the AC being converted to the DC by the AC charger, the cell of the mobile charger according to the present invention is charged through the charging unit. Thus the present invention can be used regardless of time and place. The mobile charger provides sufficient electric power to electronic products using a DC power supply regardless of time and place.
2. The mobile charger of the present invention has proper size so that users can carry it with them. While in use, sufficient power is provided to the electronic products by connecting the power supplying unit with the electronic product. Moreover, the voltage output can be regulated according to the voltage the electronic products need. Thus the mobile charger makes the electronic products such as mobile phones or digital cameras more convenient in use.

Figure 1:
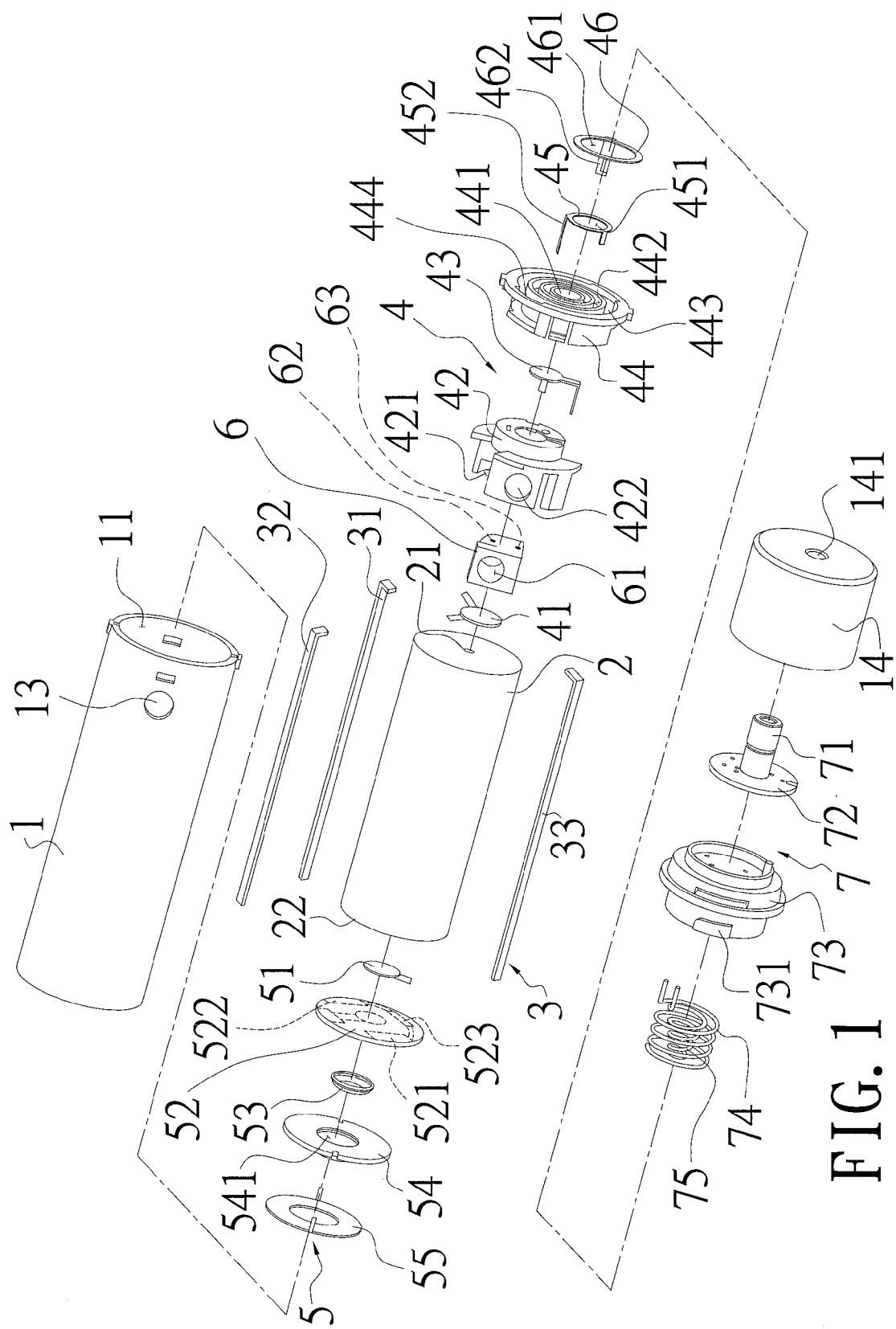
FIG. 1 is an explosive view of an embodiment according to the present invention.

| The reference numerals | | |
|---|---|---|
| 1 housing | 11 hollow part | 12 stopper flange |
| 13 through hole | 14 cover part | 141 insertion hole |
| 2 cell | 21 positive pole | 22 negative pole |
| 3 conducting piece set | 31 positive conducting piece | 32 conductive piece |
| 33 negative conducting piece 4 positive power distribution unit | | |
| 41 positive pad 42 positive plastic base 421 cavity 422 through hole | | |
| 43 inner negative plate | 44 positive base | 441 through hole |
| 442 inner circular groove | 443 outer circular groove | 444 fastening slot |
| 45 middle negative plate | 451 through hole | 452 pin |
| 46 outer positive plate | 461 through hole | 462 pin |
| 5 negative power distribution unit 51 negative pad 52 negative protection board | | |
| 521 negative pole output end 522 negative pole input end | | |
| 523 protection circuit 53 positive pole contact 54 front base 541 central hole | | |
| 55 front negative plate | 6 charging unit | 61 insertion hole |
| 62 positive pin | 63 negative pin | 7 power supplying unit |
| 71 output socket | 72 circuit board | 73 base part |
| 731 fastening block | 74 positive pin | 75 negative pin |

DETAILED DESCRIPTION OF THE PREFERRED EMBODIMENT

Figure 2:
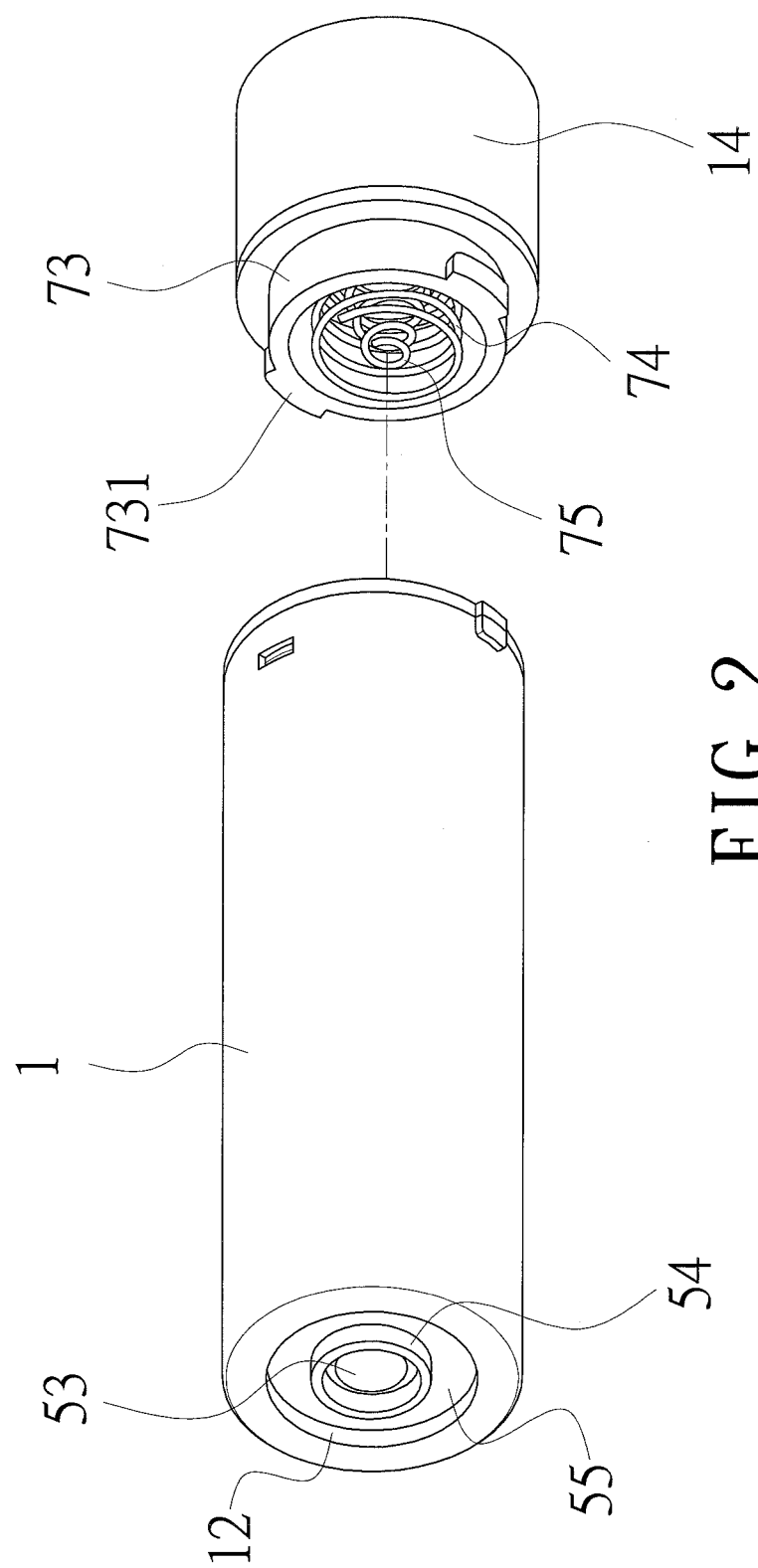
FIG. 2 is a perspective view of an embodiment according to the present invention.
Figure 3:
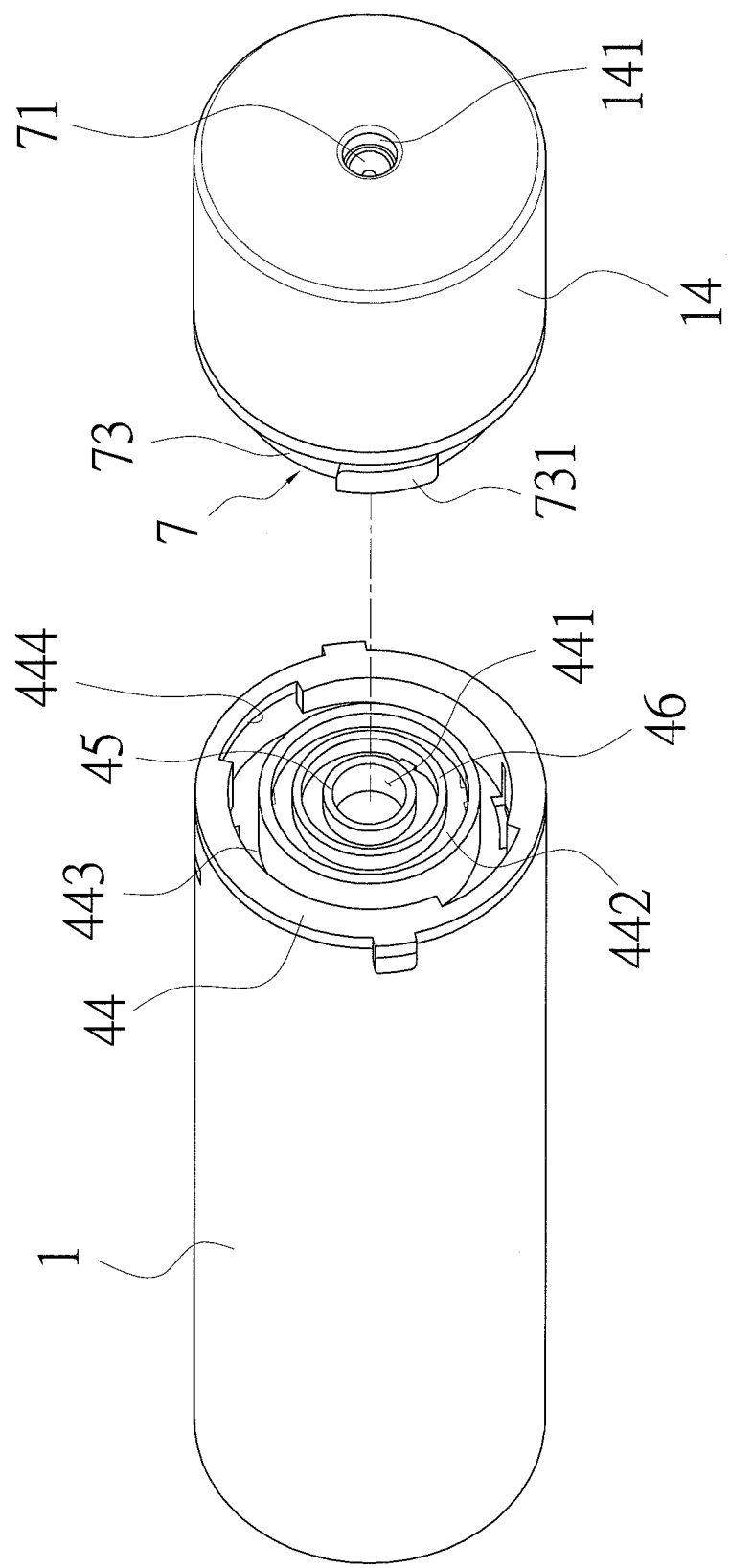
FIG. 3 is another perspective view of an embodiment according to the present invention.

Refer from FIG. 1 to FIG. 3, a mobile charger of the present invention includes a housing 1, a cell 2, a conducting piece set 3, a positive power distribution unit 4, a negative power distribution unit 5, a charging unit 6 and a power supplying unit 7.

The housing 1 is a cylinder with a hollow part 11. A stopper flange 12 is on an inner wall of the hollow part 11 at an end part of the housing 1 and a through hole 13 is arranged at a side surface of the housing 1.

The cell 2 is mounted in the hollow part 11 of the housing 1. A positive pole 21 and a negative pole 22 are respectively disposed on two ends of the cell 2. The cell 2 can be a primary battery such as a carbon zinc battery or a secondary battery such as a rechargeable lithium ion battery.

The conducting piece set 3 is arranged in the hollow part 11 of the housing 1 and located around the cell 2. The conducting piece set 3 includes a positive conducting piece 31, a conductive piece 32 and a negative conducting piece 33. One end of the positive pole conductive piece 31 is electrically connected to a positive pad 41 of the positive power distribution unit 4 while the other end of the positive conducting piece 31 is electrically connected to a positive pole contact 53 of the negative power distribution unit 5. One end of the conductive piece 32 is electrically connected to a middle negative plate 45 of the positive power distribution unit 4 while the other end of the conductive piece 32 is electrically connected to a front negative plate 55 of the negative power distribution unit 5. One end of the negative conducting piece 33 is electrically connected to an inner negative plate 43 of the positive power distribution unit 4 while the other end of the negative conducting piece 33 is electrically connected to a negative pole output end 521 of a negative protection board 52 of the negative power distribution unit 5.

The positive power distribution unit 4 is disposed on the positive pole 21 of the cell 2. The positive power distribution unit 4 includes a positive pad 41, a positive plastic base 42, an inner negative plate 43, a positive base 44, a middle negative plate 45, and an outer positive plate 46 in turn from the positive pole 21 of the cell 2 to the outer side. The positive pad 41 is attached to the positive pole 21 of the cell 2 and is electrically connected to the outer positive plate 46. A center of the positive base 44, a center of the middle negative plate 45, and a center of the outer positive plate 46 are arranged with a through hole 441, 451, 461 respectively and correspondingly. Moreover, an end surface of the positive base 44 is disposed with an inner and an outer circular grooves 442, 443. Thus a pin 452 of the middle negative plate 45 and a pin 462 of the outer positive plate 46 are respectively mounted in the inner groove 442 and the outer circular groove 443 of the positive base 44. The positive base 44 is connected to the housing 1 so as to fix the positive pad 41, the positive plastic base 42, and the inner negative plate 43 in the housing 1. A fastening slot 444 is also formed on the end surface of the positive base 44 while the positive plastic base 42 is arranged with a cavity 421 for mounting the charging unit 6 therein. The positive plastic base 42 is further disposed with a through hole 422 corresponding to an insertion hole 61 of the charging unit 6.

The negative power distribution unit 5 is disposed on the negative pole 22 of the cell 2. From the negative pole 22 of the cell 2 to an outer side thereof, the negative power distribution unit 5 is composed of a negative pad 51, a negative protection board 52, a positive pole contact 53, a front base 54, and a front negative plate 55 in turn. The negative pad 51 is electrically connected to the negative pole 22 of the cell 2. Then the negative pad 51 is electrically connected to a negative pole input end 522 of the negative protection board 52. A protection circuit 523 is disposed between the negative pole output end 521 and the negative pole input end 522 of the negative protection board 52 so as to control on/off of the negative pole output end 521 of the negative protection board 52. Moreover, the positive pole contact 53 is attached on the negative protection board 52 and extended out of a central hole 541 of the front base 54. Or the positive pole contact 53 is located in the central hole 541 of the front base 54. The front negative plate 55 is set over the front base 54 and is fixed in the housing 1 together with the front base 54, the negative protection board 52 and the negative pad 51. And the front base 54 is leaning against and positioned by the stopper flange 12 on the inner wall of the hollow part 11 of the housing 1.

The charging unit 6 is mounted in the housing 1 and the insertion hole 61 of the charging unit 6 is corresponding to the through hole 13 of the housing 1. A positive pin 62 of the charging unit 6 is electrically connected to the positive pole 21 of the cell 2 through the positive pad 41 of the positive power distribution unit 4. And a negative pin 63 of the charging unit 6 is electrically connected to the negative pole 22 of the cell 2 through the negative conducting piece 33 of the conducting piece set 3, the negative pad 51 and the negative protection board 52 of the negative power distribution unit 5.

The power supplying unit 7 is mounted in a cover part 14 of the housing 1. An output socket 71, a circuit board 72, a base part 73, a positive pin 74 and a negative pin 75 are assembled in a cavity of the cover part 14 in turn. The output socket 71 is extended out of an insertion hole 141 of the cover part 14 and is electrically connected to the circuit board 72 while the circuit board 72 is fixed on one end of the base part 73. The positive pin 74 and the negative pin 75 in spring forms are provided at the other end of the base part 73 and are electrically connected to the circuit board 72. A fastening block 731 is disposed on one side of the base part 73. The fastening block 731 is corresponding to and locked with the fastening slot 444 on the end surface of the positive base 44 of the positive power distribution unit 4. The positive pin 74 is electrically connected to the outer positive plate 46 on the end surface of the positive base 44 and is further electrically connected to the positive pad 41 and the positive pole 21 of the cell 2 through the outer positive plate 46. The negative pin 75 is electrically connected to the inner negative plate 43 and is further electrically connected to the negative conducting piece 33, the negative protection board 52 and the negative pad 51 of the negative power distribution unit 5, and the negative pole 22 of the cell 2 through the inner negative plate 43.

Figure 4:
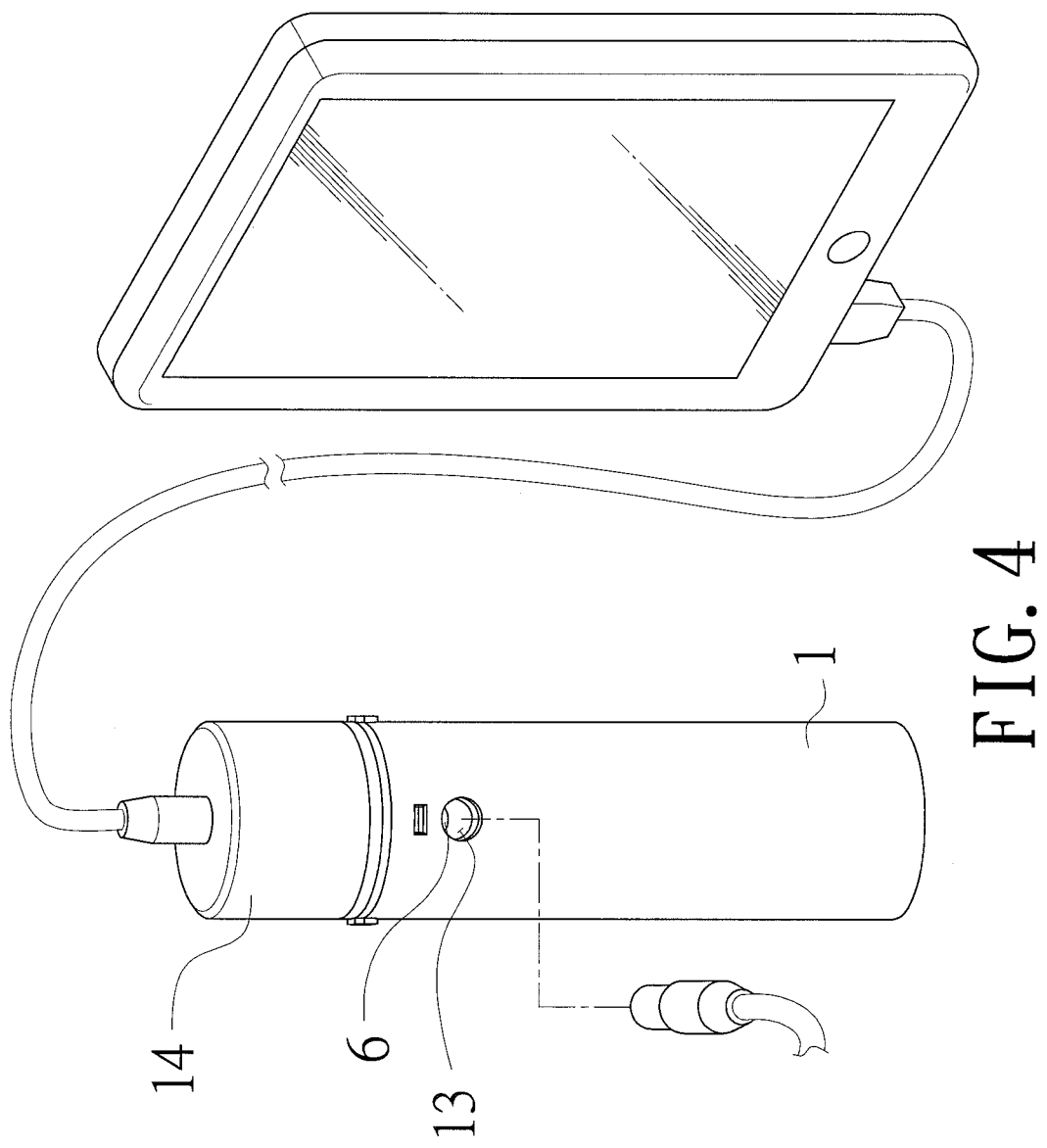
FIG. 4 is a schematic drawing showing an embodiment in use according to the present invention.

As shown in FIG. 4, when user's electronics such as mobile phones, digital cameras need DC power for working, the output socket 71 of the power supplying unit 7 is connected to the electronics. Thus DC power in the cell 2 passes the positive pole 21, the electrically connected positive pad 41 and the outer positive plate 46 to the positive pin 74. Then the DC power passes the circuit board 72, the negative pin 75, the inner negative plate 43 electrically connected to the negative pin 75, the negative conducting piece 33, the negative protection board 52, the negative pad 51, and the negative pole 22 of the cell 2 to form a loop. Thus the DC (direct current) passes the circuit board 72 and flows to the output socket 71 electrically connected to the circuit board to be output. By the output socket 71, the DC is output to the electronics such as mobile phones or digital cameras. Thus sufficient power the mobile phone or the digital camera need is provided regardless time and place, even outdoors or in the movement.

Moreover, when the direct current in the cell 2 is run out of and the cell 2 needs to be charged, one end of the AC charger is connected to a household AC socket while the other end thereof is plugged into the insertion hole 61 of the charging unit 6 of the present invention. Thus the alternating current is converted to direct current by the AC charger and then the DC flows into the charging unit 6, then passes through the positive pad 41 electrically connected to the positive pin 62 of the charging unit 6, the negative conducting piece 33 electrically connected to the negative pin 63, the negative protection board 52 and the negative pad 51, and the into the positive and negative poles 21, 22 of the cell 2 so that the cell 2 is fully charged and is ready to provide DC power next time.

In addition, the circuit board 72 of the power supplying unit 7 is disposed with a modulation circuit. The modulation circuit is connected to an adjustment button projecting from the cover part 14. Thus the voltage can be adjusted according to the voltage the electronics to be charged required. The present invention has more applications.

In summary, the charging unit charges the cell after the AC being converted to the DC by the AC charger. Then the cell fully charged outputs DC by the power supplying unit so as to provide sufficient electric power to an electronic such as mobile phone or digital camera while users are at outdoors or in the movement. Thus users can use electronics such as mobile phones, digital cameras, etc. easily and conveniently at different occasions and various states regardless of time and place.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A mobile charger comprising:
   a housing (1),
   a cell (2) mounted in the housing (1);
   a positive power distribution unit (4) and a negative power distribution unit (5) disposed on two ends of the housing (1) and corresponding to a positive pole (21) and a negative pole (22) of the cell (2) respectively;
   a conducting piece set (3) provided in the housing (1) and electrically connected to the positive power distribution unit (4) and the negative power distribution unit (5);
   a charging unit (6) set in the housing (1); a positive pin (62) and a negative pin (63) of the charging unit (6) are electrically connected to the positive pole (21) and the negative pole (22) of the cell (2) through the positive power distribution unit (4), the conducting piece set (3) and the negative power distribution unit (5);
   a power supplying unit (7) set in the housing (1); a positive pin (74) and a negative pin (75) of the power supplying unit (7) are electrically connected to the positive pole (21) and the negative pole (22) of the cell (2) through the positive power distribution unit (4), the conducting piece set (3) and the negative power distribution unit (5);
   wherein the housing (1) includes a cover part (14) that is movably connected to the housing (1) and the power supplying unit (7) is mounted in the cover part (14); and the power supplying unit (7) includes an output socket (71), a circuit board (72), a base part (73), a positive pin (74) and a negative pin (75); the output socket (71) is extended out of an insertion hole (141) of the cover part (14) and is electrically connected to the circuit board (72); the circuit board (72) is fixed on one end of the base part (73) while the positive pin (74) and the negative pin (75) are arranged at the other end of the base part (73) and are electrically connected to the circuit board (72).

2. The mobile charger as claimed in claim 1, wherein the positive power distribution unit (4) includes a positive pad (41), an inner negative plate (43), a middle negative plate (45), and an outer positive plate (46) in turn from the positive pole (21) of the cell (2) to an outer side; the negative power distribution unit (5) includes a negative pad (51), a negative protection board (52), a positive pole contact (53), and a front negative plate (55) in turn from the negative pole (22) of the cell (2) to an outer side; the conducting piece set (3) is disposed with a positive conducting piece (31), a conductive piece (32) and a negative conducting piece (33); one end of the positive pole conductive piece (31) is electrically connected to the positive pad (41) of the positive power distribution unit (4) while the other end of the positive conducting piece (31) is electrically connected to the positive pole contact (53) of the negative power distribution unit (5); one end of the conductive piece (32) is electrically connected to the middle negative plate (45) of the positive power distribution unit (4) while the other end of the conductive piece (32) is electrically connected to the front negative plate (55) of the negative power distribution unit (5); one end of the negative conducting piece (33) is electrically connected to the inner negative plate (43) of the positive power distribution unit (4) while the other end of the negative conducting piece (33) is electrically connected to a negative pole output end (521) of the negative protection board (52) of the negative power distribution unit (5); a negative pole input end (522) of the negative protection board (52) is electrically connected to the negative pad (51); the positive pin (62) of the charging unit (6) is electrically connected to the positive pole (21) of the cell (2) through the positive pad (41) of the positive power distribution unit (4); a negative pin (63) of the charging unit (6) is electrically connected to the negative pole (22) of the cell (2) through the negative conducting piece (33) of the conducting piece set (3), the negative pad (51) and the negative protection board (52) of the negative power distribution unit (5); the positive pin (74) of the power supplying unit (7) is electrically connected to the outer positive plate (46) and is further electrically connected to the positive pad (41) and the positive pole (21) of the cell (2) through the outer positive plate (46); the negative pin (75) is electrically connected to the inner negative plate (43) and is further electrically connected to the negative conducting piece (33), the negative protection board (52) and the negative pad (51) of the negative power distribution unit (5), and the negative pole (22) of the cell (2) through the inner negative plate (43).

3. The mobile charger as claimed in claim 2, wherein the positive power distribution unit (4) further includes a positive plastic base (42) and a positive base (44); the positive plastic base (42) is disposed between the positive pad (41) and the inner negative plate (43) while the positive base (44) is arranged between the inner negative plate (43) and the middle negative plate (45); a center of the positive base (44), a center of the middle negative plate (45), and a center of the outer positive plate (46) are arranged with a through hole (441), (451), (461) respectively and correspondingly; an end surface of the positive base (44) is disposed with an inner and an outer circular grooves (442), (443); a pin (452) formed on the middle negative plate (45) and a pin (462) formed on the outer positive plate (46) are respectively mounted in the inner groove (442) and the outer circular groove (443) of the positive base (44); the positive base (44) is connected to the housing (1) so as to fix the positive pad (41), the positive plastic base (42), and the inner negative plate (43) in the housing (1); the negative power distribution unit (5) is disposed with a front base (54) and the front negative plate (55) is arranged at the front base (54); the front base (54) is provided with a central hole (541) and the positive pole contact (53) is passed through the central hole (541); the front base (54), the negative protection board (52) and the negative pad (51) are fixed in the housing (1).

4. The mobile charger as claimed in claim 2, wherein the negative protection board (52) is disposed with the protection circuit (523); the protection circuit (523) is electrically connected between the negative pole output end (521) and the negative pole input end (522).

5. The mobile charger as claimed in claim 1, wherein the charging unit (6) is arranged with an insertion hole (61) while the housing (1) is mounted with a through hole (13) and the through hole (13) is corresponding to the insertion hole (61) of the charging unit (6).

6. The mobile charger as claimed in claim 1, wherein the power supplying unit (7) is disposed with a modulation circuit and the modulation circuit is connected to an adjustment button.

* * * * *